(12) United States Patent
Ronzani

(10) Patent No.: US 8,440,280 B2
(45) Date of Patent: May 14, 2013

(54) MULTI LAYER FILM

(75) Inventor: Alberto Ronzani, Belgium (NL)

(73) Assignee: Saudi Basic Industries Corporation, Riyadh (SA)

( * ) Notice: Subject to any disclaimer, the term of this patent is extended or adjusted under 35 U.S.C. 154(b) by 125 days.

(21) Appl. No.: 13/125,702

(22) PCT Filed: Oct. 21, 2009

(86) PCT No.: PCT/EP2009/007535
§ 371 (c)(1), (2), (4) Date: Jul. 12, 2011

(87) PCT Pub. No.: WO2010/046098
PCT Pub. Date: Apr. 29, 2010

(65) Prior Publication Data
US 2011/0274901 A1    Nov. 10, 2011

(30) Foreign Application Priority Data
Oct. 24, 2008 (EP) .................... 08018628

(51) Int. Cl.
B29D 22/00 (2006.01)

(52) U.S. Cl.
USPC .................... 428/35.7; 428/36.91

(58) Field of Classification Search .......... 428/35.7, 428/36.91
See application file for complete search history.

(56) References Cited

U.S. PATENT DOCUMENTS

| | | | |
|---|---|---|---|
| 3,753,331 A | 8/1973 | Sato | |
| 6,045,882 A | 4/2000 | Sandford | |
| 6,815,057 B2 * | 11/2004 | Hodson et al. | 428/349 |
| 6,893,730 B2 * | 5/2005 | Moulton et al. | 428/474.4 |
| 2002/0187290 A1 | 12/2002 | Hodson et al. | 428/35.7 |
| 2004/0058173 A1 * | 3/2004 | Moulton et al. | 428/474.4 |
| 2006/0246280 A1 * | 11/2006 | Chambliss et al. | 428/354 |
| 2011/0274901 A1 * | 11/2011 | Ronzani | 428/216 |
| 2012/0288692 A1 * | 11/2012 | Broyles et al. | 428/213 |

FOREIGN PATENT DOCUMENTS

| | | |
|---|---|---|
| EP | 0747295 A1 | 12/1996 |
| EP | 0908400 A1 | 4/1999 |
| EP | 0781651 B1 | 10/1999 |
| EP | 0634270 B1 | 5/2001 |
| EP | 1795161 A1 | 6/2007 |
| JP | 2002273843 A | 9/2002 |
| WO | 9824711 A1 | 6/1998 |
| WO | 03055773 A1 | 7/2003 |

OTHER PUBLICATIONS

Japanese Patent No. 2002273843 (A); Date of Publication: Sep. 25, 2002; Machine Translation from the Japanese Patent Office; 10 pages.
Butler, Thomas I.; "File Extrusion Manual: Process, Materials, Properties"; Second Edition; Tappi Press; 2005; 53 pages.
Extended European Search Report; European Application No. 08018628.1; Date of Mailing: Apr. 15, 2009; 6 Pages.
Jonson, Gunilla; "Challenges to Packaging in a Global World"; Presentation at the Marcus Wallenberg Prize Symposium; Sep. 30, 2005; 12 Pages.
Marsh, et al.; "Food Packaging—Roles, Materials, and Environmental Issues"; Institute of Food Technologists; Journal of Food Science; vol. 72, No. 3; 2007; 17 Pages.
International Search Report; International Application No. PCT/EP2009/007535; International Filing Date: Oct. 21, 2009; Date of Mailing: Jul. 12, 2009; 7 Pages.
Written Opinion of the International Searching Authority; International Application No. PCT/EP2009/007535; International Filing Date: Oct. 21, 2009; Date of Mailing: Jul. 12, 2009; 6 Pages.

* cited by examiner

Primary Examiner — N. Edwards
(74) Attorney, Agent, or Firm — Cantor Colburn LLP

(57) ABSTRACT

The invention is directed to a multi layer film to be used as a flexible packaging material for enclosing and containing one or more compressible products in a sealed condition. The 5 layer film according to the invention consists of I. a first layer comprising low density polyethylene, II. a second layer comprising high density polyethylene, III. a third layer comprising linear low density polyethylene, IV. a fourth layer comprising high density polyethylene and V. a fifth layer comprising linear low density polyethylene.

11 Claims, No Drawings

MULTI LAYER FILM

CROSS REFERENCE TO RELATED APPLICATIONS

This application is a 371 of International Application No. PCT/EP2009/007535, filed Oct. 21, 2009, which claims priority to European Application No. 08018628.1, filed Oct. 24, 2008, both of which are hereby incorporated by reference in its entirety.

BACKGROUND

The invention is directed to a multi layer film that can be used as a flexible packaging material for enclosing and containing one or more compressible products in a sealed condition. The invention is also directed to the package containing products in a compressed condition comprising the multilayer film according to the present invention.

Companies as well as consumers pay more and more attention to environmental and sustainability aspects of packaging (see e.g. Challenges to Packaging in a global world, Gunilla Jonson, Marcus Wallenberg Prize symposium, Sep. 30, 2005 and Marsh, Food Packaging, Journal of Food Science, Vol. 72, 3, 2007, pages 39-55). Using lower amounts of raw materials, reducing costs and developing additional packaging functionalities have become important goals for research and development. When it comes to packaging there appear to be a lot of theoretically options to improve sustainability such as for example using thinner layers of different materials, using less material by changing the shape of the package, using recycled material and using refillable packages. However these solutions often do not result in a packaging that fulfils the requirements for providing a good protection to the packaged products.

The key to successful packaging is to select the packaging material and design that best fulfils technical and commercial requirements with regard to product characteristics, marketing considerations, environmental issues and cost. Not only is balancing so many factors difficult but also it requires a different analysis for each product.

There exist many packaging techniques such as for example compression packaging wherein product is compressed while being packaged to reduce its volume. Compression packaging may be used for packaging of for example insulation materials (EP 908400 A1), absorbent articles such as diapers (EP 747295 A1 and EP 1795161 A1) as well as textile articles and straw.

Packaging techniques have been developed for providing a package comprising for example a number of flexible diaper bags. WO 03/055773 discloses that when transporting finished products from the point of manufacture to the point of sale, or to an intermediate storage facility, it is often desirable to enclose a plurality of products within a larger, more durable package. Not only does this preserve the products in their desired, saleable condition, it minimizes the number of individual items to be handled and generally provides more uniformly shaped items for stacking and handling. Products often shipped in a compressed condition are disposable absorbent products for example disposable diapers can be highly compressed and packaged to minimize shipping and storage space requirements. Also WO 98/24711 discloses a package for efficiently packaging and shipping compressible products, and a method for producing such a package.

During transport it is essential to have the guarantee of an excellent sealing between the several parts of the flexible package. Sealing of the film end flaps can be done by using sealing equipment such as a compression packaging machine as for example disclosed in U.S. Pat. No. 3,753,331.

Polymers have many applications in the packaging industry and the polymers which are potential suitable are countless and in film extrusion these polymers may be used as a single or as a multilayer structure. JP2002273843 discloses a polyethylene based film for compression packaging consisting of three layers. The first and the second layer of the three layers are an ethylene-alpha olefin copolymer and the third layer is a low density polyethylene.

SUMMARY

It is an object of the present invention to provide a multilayered film which has improved raw material efficiency while fulfilling all technical requirements for its use as packaging film. In case of savings in amount of packaging material these savings should not result in a lower quality product. Furthermore the requirements for a good protection of the packaged products should still be met.

The multi layer polymer film according to the invention is a 5 layer film consisting of I. a first layer comprising low density polyethylene (LDPE)
II. a second layer comprising high density polyethylene (HDPE)
III. a third layer comprising linear low density polyethylene (LLDPE)
IV. a fourth layer comprising high density polyethylene (HDPE)
V. a fifth layer comprising linear low density polyethylene (LLDPE)

DETAILED DESCRIPTION

The 5 layer packaging film according to the invention results in packaging having excellent sealing properties in combination with an excellent puncture resistance, tear propagation resistance, creep and resistance to expansion pressure.

About 20% thickness reduction is achieved by using the 5 layer film according to the invention by the selection of specific polyethylenes and amounts in each of the 5 layers in comparison with 3 layered films used in the technical field of compression packaging. Thanks to the versatility of the 5 layers extrusion setup more raw materials types in a more efficient combination can be used. A functional use of higher concentrated raw materials, for example HDPE, can be applied in a functional way with a 5 layers structure, while this is not possible with the 3 layers set up.

The total thickness of the film depends on the packaging size and on the content of the packaging. For packaging of diapers the package may contain for example between 4 and 72 diapers. The thickness of the 5 layer film may range between 20 and 60 micrometers depending on the desired use.

Generally thin film is applied for the package or bag with the lowest content of diapers and the thickest film is applied for the package with the highest amount of diapers.

The invention is also directed to a package for containing products in a compressed condition comprising the 5 layer film according to the invention. According to a preferred embodiment of the invention the package to contain products in a compressed condition is a bag.

Down gauging improvement is obtained while maintaining the required performance regarding for example sealability, puncture resistance and processing characteristics.

To obtain the flexible package suitable for enclosing and containing one or more compressible products in a sealed condition comprising the 5 layer film as described above two 5 layer films according to the invention may be sealed together to obtain 2 bag plies during the production of a bag. To obtain 4 bag plies 4 layers of the 5 layer film according to the invention are sealed together.

A key mechanical property of a bag for compressible products is the seal strength on 2 and 4 bag plies on the bag as these needs to withstand the expansion pressure of the volume compressed packed item and to ensure the integrity of the package. Most stringent technical product specifications of these bags concern this parameter. The required values from manufacturer specifications for these films are respectively 15.7 N/15 mm for 4 bag plies of a 70 micrometers film and 34.8 N/15 mm for 2 bag plies of a 70 micrometers film. This seal strength is measured to ASTM F88 in Newton per 15 millimeter (N/15 mm) and corresponds to the necessary force to open a sealed film of 15 mm width.

The 5 layer film according to the invention shows a seal strength on 2 bag plies in the range between about 35 N/15 mm and 42 N/15 mm.

The 5 layer film according to the invention shows a seal strength on 4 bag plies in the range between about 60 N/15 mm and 75 N/15 mm.

In the case of 2 bag plies layer V of a first 5 layer film according to the invention is sealed onto layer V of a second 5 layer film according to the invention. The seal strength is measured between these two layers.

In the case of 4 bag plies one has triple seal. Layer V of a first 5 layer film according to the invention is sealed onto layer V of a second 5 layer film according to the invention. In particular the film is folded and sealed in such way that the following layers adhere and are sealed onto each other to form the bottom of the packaging: layer V is sealed onto layer V, layer I onto layer I and layer V onto layer V. The seal strength is measured on the complete multiple seal as described above. These bag plies show twice the thickness because the film is folded before to be sealed, for example to create the bottom of the bag.

Preferably the first layer comprises low density polyethylene and linear low density polyethylene.

Preferably the second layer comprises high density polyethylene and linear low density polyethylene.

Preferably the third layer comprises linear low density polyethylene and low density polyethylene.

Preferably the fourth layer comprises high density polyethylene and linear low density polyethylene.

Preferably the fifth layer comprises linear low density polyethylene and low density polyethylene.

According to a preferred embodiment of the invention the 5 layer polymer consists of
I. a first layer comprising low density polyethylene and linear low density polyethylene
II. a second layer comprising high density polyethylene and linear low density polyethylene
III. a third layer comprising linear low density polyethylene and low density polyethylene
IV. a fourth layer comprising high density polyethylene and linear low density polyethylene and
V. a fifth layer comprising linear low density polyethylene and low density polyethylene.

Preferably the first layer comprises low density polyethylene and linear low density polyethylene in a weight ratio between 9:1 and 1:9.

Preferably the second layer comprises high density polyethylene and linear low density polyethylene in a weight ratio between 9:1 and 1:9.

Preferably the third layer comprises linear low density polyethylene and low density polyethylene in a weight ratio between 9:1 and 1:9.

Preferably the fourth layer comprises high density polyethylene and linear low density polyethylene in a weight ratio between 9:1 and 1:9.

Preferably the first layer comprises between 60 and 90% by weight low density polyethylene and between 10 and 40% by weight linear low density polyethylene.

Preferably the second and the fourth layer comprises between 40 and 70% by weight high density polyethylene and between 30 and 60% by weight linear low density polyethylene.

Preferably the third layer comprises between 20 and 60% by weight low density polyethylene and between 40 and 80% by weight linear low density polyethylene.

Preferably the fifth layer comprises between 60 and 100% by weight linear low density polyethylene and between 0 and 40% by weight low density polyethylene.

The weight percentages are related to the total amount of polyethylene in each layer.

The total thickness of the 5 layer film ranges between 20 and 60 micrometers.

Preferably the first layer has a layer thickness between 10 and 20 micrometers.

Preferably the second layer has a layer thickness between 1 and 10 micrometers.

Preferably the third layer has a layer thickness between 10 and 20 micrometers.

Preferably the fourth layer has a layer thickness between 1 and 10 micrometers

Preferably the fifth layer has a layer thickness between 10 and 20 micrometers.

According to a preferred embodiment of the invention the 5 layer film consists of
I. a first layer comprising between 60 and 90% by weight low density polyethylene and between 10 and 40% by weight linear low density polyethylene having a layer thickness between 10 and 20 micrometers
II. a second layer comprising between 40 and 70% by weight high density polyethylene and between 30 and 60% by weight linear low density polyethylene having a layer thickness between 1 and 10 micrometers
III. a third layer comprising between 20 and 60% by weight low density polyethylene and between 40 and 80% by weight linear low density polyethylene having a layer thickness between 10 and 20 micrometers
IV. a fourth layer comprising between 40 and 70% by weight high density polyethylene and between 30 and 60% by weight linear low density polyethylene having a layer thickness between 1 and 10 micrometers and
V. a fifth layer comprising between 60 and 100% by weight linear low density polyethylene and between 0 and 40% by weight low density polyethylene having a layer thickness between 10 and 20 micrometers.

The most important function of the first outside layer is protection.

The most important function of the second and the fourth layer is providing stiffness and down gauging potential.

Furthermore the second and fourth layers enhance creep and compression resistance.

The most important function of the third layer is providing impact resistance and puncture resistance.

The most important function of the fifth layer is providing seal strength and tear (propagation) resistance.

The tear propagation resistance of the film according to the invention ranges between 20 and 40 g/µ, in the machine direction (MD). The tear propagation resistance ranges between 10 and 25 g/µ, in the transverse direction (TD). The tear propagation resistance tests are determined according to ISO 6383.

The Maximum Force (F-Max) of puncture resistance of the film according to the invention ranges between 5 and 8 N. The F-Max is determined according to ASTM D 5748-95.

The Monsanto dart drop of the film according to the invention ranges between 4 and 10 g/µ, (determined according to ASTM D1709).

Preferably the density of the LDPE ranges between 915 kg/m$^3$ and 928 kg/m$^3$

Preferably the melt flow index (190° C./2.16 Kg) of the LDPE ranges between 0.2 and 2 g/10 min. (determined via ASTM D1238).

Preferably the density of the HDPE ranges between 940 kg/m$^3$ and 965 kg/m$^3$

Preferably the melt flow index (190° C./2.16 Kg) of the HDPE ranges between 0.2 and 2.5 g/10 min and the melt flow index (190° C./5 Kg) ranges between 0.1 and 4 g/10 min.

Preferably the density of the LLDPE is above 915 kg/m$^3$ and ranges between 916 kg/m$^3$ and 934 kg/m$^3$.

Preferably the melt flow index (190° C./2.16 Kg) of the LLDPE ranges between 0.3 and 3 g/10 min.

The production processes of LDPE, HDPE and LLDPE are summarised in Handbook of Polyethylene by Andrew Peacock (2000; Dekker; ISBN 0824795466) at pages 43-66. The catalysts can be divided in three different subclasses including Ziegler Natta catalysts, Phillips catalysts and single site catalysts. The latter class is a family of different classes of compounds, metallocene catalysts being one of them. As elucidated at pages 53-54 of said Handbook a Ziegler-Natta catalysed polymer is obtained via the interaction of an organometallic compound or hydride of a Group I-III metal with a derivative of a Group IV-VIII transition metal. An example of a (modified) Ziegler-Natta catalyst is a catalyst based on titanium tetra chloride and the organometallic compound triethylaluminium. A difference between metallocene catalysts and Ziegler Natta catalysts is the distribution of active sites. Ziegler Natta catalysts are heterogeneous and have many active sites. Consequently polymers produced with these different catalysts will be different regarding for example the molecular weight distribution and the comonomer distribution.

The LDPE applied in the present film may be produced by use of autoclave high pressure technology and by tubular reactor technology.

The technologies suitable for the LLDPE manufacture include gas-phase fluidized-bed polymerization, polymerization in solution, polymerization in a polymer melt under very high ethylene pressure, and slurry polymerization.

According to a preferred embodiment of the present invention the LLDPE has been obtained with gas phase polymerisation in the presence of a Ziegler-Natta catalyst.

The linear low density polyethylene component of the composition is a low density polyethylene copolymer comprising ethylene and a $C_3$-$C_{10}$ alpha-olefin co monomer. Suitable alpha-olefin co monomers include butene, hexene, 4-methyl pentene and octene. The preferred co monomer is hexene.

Preferably, the alpha-olefin comonomer is present in an amount of about 5 to about 20 percent by weight of the ethylene-alpha olefin copolymer, more preferably an amount of from about 7 to about 15 percent by weight.

The polymer composition of each layer may also contain appropriate amounts of other additives such as for example fillers, antioxidants, pigments, stabilisers, antistatic agents and polymers depending on the specific use of the 5 layer film.

The multilayer films of the present invention may be prepared by any method known in the art. Multilayer structures may be prepared for example by a blown film co-extrusion process as disclosed in "Film Extrusion Manual", (TAPPI PRESS, 2005, ISBN 1-59510-075-X, Editor Butler, pages 413-435).

In the process of coextrusion, the various resins are first melted in separate extruders and then brought together in a feed block. The feed block is a series of flow channels which bring the layers together into a uniform stream. From this feed block, this multilayer material then flows through an adapter and out a film die. The blown film die is an annular die. The die diameter can be a few centimeters to more than three meters across. The molten plastic is pulled upwards from the die by a pair of nip rolls high above the die (4 meters to more than 20 meters or more depending on the amount of cooling required). Changing the speed of these nip rollers will change the gauge (wall thickness) of the film. Around the die sits an air-ring. The air-ring cools the film as it travels upwards. In the centre of the die is an air outlet from which compressed air can be forced into the centre of the extruded circular profile, creating a bubble. This expands the extruded circular cross section by some ratio (a multiple of the die diameter). This ratio, called the "blow-up ratio" can be just a few percent to more than 200 percent of the original diameter. The nip rolls flatten the bubble into a double layer of film whose width (called the "layflat") is equal to ½ the circumference of the bubble. This film can then be spooled or printed on, cut into shapes, and heat sealed into bags or other items.

U.S. Pat. No. 6,045,882 discloses a multilayer, biaxially stretched, flexible, thermoplastic film having at least three layers (a), (b), and (c) with layer (b) disposed between layers (a) and (c), layers (a) and (c) each being a blend of at least 45% of a copolymer of ethylene and at least one $C_3$-$C_{10}$ alpha-olefin, having a density between 0.900 g/cm$^3$ and 0.915 g/cm$^3$, and a melting point between 85 and 125° C. with at least 5% of a high density polyethylene, and layer (b) being at least 45% of a copolymer of ethylene and at least one $C_3$-$C_{10}$ alpha-olefin, having a density between 0.900 g/cm$^3$ and 0.915 g/cm$^3$, and a melting point between 85 and 125° C., the film being 50.8 micrometers or less in thickness, and having a shrinkage value of at least 60% in at least one direction at 127° C. and a process for making the film. In contrast to U.S. Pat. No. 6,045,882 the present invention is not directed to shrink film. In contrast to the present invention important characteristics in U.S. Pat. No. 6,045,882 are for example the biaxial orientation, the shrink ratio, hot slip properties, vapour permeability, heat sealing voltage rate, haze value and oxygen transmission rate. The density of LLDPE in U.S. Pat. No. 6,045,882 is less than 915 kg/m$^3$ whereas the density of LLDPE in the present invention is above 915 kg/m$^3$ In contrast to the present invention which is directed to a 5 layer film EP 634270 A1 discloses a three layer film. This film is composed of an outer layer comprising a linear ethylene/alpha-olefin copolymer having a density of 0.920-0.950 g/cm$^3$, an intermediate layer comprising a linear ethylene/alpha-olefin copolymer having a density of 0.920 g/cm$^3$ or less, and an inner layer comprising a resin composed of a linear ethylene/alpha-olefin copolymer having a density of 0.940 g/cm$^3$ or less and containing 20-40 wt. % of polypropylene. A high-density polyethylene having a density of 0.960 g/cm$^3$ or above is incorporated in all of the outer, intermediate and inner layers in amounts of, respectively, 15-55 wt. %, 15-55 wt. % and 5-50 wt. %. The requirements for the film of EP 634270 A1 are different because the film has to be applied in a different technical field of application being in the production of medical plastic containers such as transfusion bags. The bag is made by molding said film, which is free from the fear of sealing strength lowering, deformation, transparency lowering, and even when sterilized at a temperature as high as 120° C. or above and can provide a double-compartment container having a stabilized, easy-to-peel sealing part, thus being suitable for use as a transfusion bag.

The invention will be further elucidated by the following non-restrictive example.

EXAMPLES

Example I

A 5 layer film having a thickness of 55 micrometers was composed as follows:

the first layer has a thickness of 15 micrometers and comprises 80% by weight low density polyethylene and 20% by weight linear low density polyethylene the second layer has a thickness of 5 micrometers and comprises 60% by weight high density polyethylene and 40% by weight linear low density polyethylene the third layer has a thickness of 15 micrometers and comprises 60% by weight linear low density polyethylene and 40% by weight low density polyethylene the fourth layer has a thickness of 5 micrometers and comprises 60% by weight high density polyethylene and 40% by weight linear low density polyethylene the fifth layer has a thickness of 15 micrometers and comprises 60% by weight linear low density polyethylene and 40% by weight low density polyethylene.

The weight percentages were related to the total amount of polyethylene in each layer.

The applied polyethylenes were:

the low density polyethylene was SABIC LDPE 2201TH12 having a density of 922 kg/m$^3$ and MFR (2.16 kg/190° C.) of 0.85 g/10 minutes the linear low density polyethylene was SABIC LLDPE 6118NE having a density of 918 kg/m$^3$ and MFR (2.16 kg/190° C.) of 1.0 g/10 minutes the high density polyethylene was SABIC HDPE F4660 having a density of 961 kg/m$^3$ and MFR (2.16 kg/190° C.) of 0.7 g/10 minutes The film was produced on the 5 layer co-extrusion blown film line from Reifenhauser with the following conditions:

Die gap: 1.8 mm
Die diameter: 300 mm
Extruder temperature profile: 180-210° C. (feed section to die)
Internal Bubble Cooling air temperature 12° C.
Blow up Ratio: 2.5
Line speed: 36 meters/minute
Film Lay flat: 1200 mm The film was characterised as follows:

The Monsanto dart drop: 6 g/μ (determined according to ASTM D1709).
The tear propagation resistance (TD): 29 g/μ (determined according to ISO 6383).
The tear propagation resistance (MD): 12 g/μ (determined according to ISO 6383).
The F-Max of puncture resistance: 6.1 N (determined according to ASTM D 5748-95)
The tensile stress at yield (TD): 16 MPa (determined according to ISO 527).
The tensile stress at yield (MD): 14.5 MPa (determined according to ISO 527).
Stress at break (TD): 33 MPa (determined according to ISO 527).
Stress at break (MD): 34 MPa (determined according to ISO 527).
The seal strength on 2 bag plies was 38 N/15 mm (determined according to ASTM F88)
The seal strength on 4 bag plies was 69 N/15 mm (determined according to ASTM F88)

The bags were produced from the 5 layer packaging film under the following conditions:

| | |
|---|---|
| Radius seal device | 1.0 mm |
| Seal time device | 70 minutes |
| Temperature seal device | 480° C. |
| Shore hardness seal device | 60 |
| Seal time pre-seal | 60 minutes |
| Temperature pre-seal | 240° C. |
| Seal frequency | 120 min$^{-1}$ |

The invention claimed is:

1. A 5 layer film consisting of:
   I. a first layer comprising low density polyethylene;
   II. a second layer comprising high density polyethylene;
   III. a third layer comprising linear low density polyethylene;
   IV. a fourth layer comprising high density polyethylene; and
   V. a fifth layer comprising linear low density polyethylene.

2. The 5 layer film according to claim 1 wherein the film consists of:
   I. a first layer comprising low density polyethylene and linear low density polyethylene;
   II. a second layer comprising high density polyethylene and linear low density polyethylene;
   III. a third layer comprising linear low density polyethylene and low density polyethylene;
   IV. a fourth layer comprising high density polyethylene and linear low density polyethylene; and
   V. a fifth layer comprising linear low density polyethylene and low density polyethylene.

3. The 5 layer film according to claim 2, wherein the film consists of
   I. a first layer comprising between 60 and 90% by weight low density polyethylene and between 10 and 40% by weight linear low density polyethylene;
   II. a second layer comprising between 40 and 70% by weight high density polyethylene and between 30 and 60% by weight linear low density polyethylene;
   III. a third layer comprising between 20 and 60% by weight low density polyethylene and between 40 and 80% by weight linear low density polyethylene;
   IV. a fourth layer comprising between 40 and 70% by weight high density polyethylene and between 30 and 60% by weight linear low density polyethylene; and
   V. a fifth layer comprising between 60 and 100% by weight linear low density polyethylene and between 0 and 40% by weight low density polyethylene.

4. The 5 layer film according to claim 1, wherein the film consists of:
   I. a first layer comprising between 60 and 90% by weight low density polyethylene and between 10 and 40% by weight linear low density polyethylene having a layer thickness between 10 and 20 micrometers;

II. a second layer comprising between 40 and 70% by weight high density polyethylene and between 30 and 60% by weight linear low density polyethylene having a layer thickness between 1 and 10 micrometers;

III. a third layer comprising between 20 and 60% by weight low density polyethylene and between 40 and 80% by weight linear low density polyethylene having a layer thickness between 10 and 20 micrometers;

IV. a fourth layer comprising between 40 and 70% by weight high density polyethylene and between 30 and 60% by weight linear low density polyethylene having a layer thickness between 1 and 10 micrometers; and V. a fifth layer comprising between 60 and 100% by weight linear low density polyethylene and between 0 and 40% by weight low density polyethylene having a layer thickness between 10 and 20 micrometers.

5. A package for containing products in a compressed condition comprising a 5 layer film consisting of:
  I. a first layer comprising low density polyethylene;
  II. a second layer comprising high density polyethylene;
  III. a third layer comprising linear low density polyethylene;
  IV. a fourth layer comprising high density polyethylene; and
  V. a fifth layer comprising linear low density polyethylene.

6. The package according to claim 5 wherein the seal strength on 2 bag plies ranges between 35 N/15 mm and 42 N/15 mm (measured according to ASTM F88).

7. The package according to claim 5 wherein the seal strength on 4 bag plies ranges between 60 N/15 mm and 75 N/15 mm (measured according to ASTM F88).

8. The package according to claim 5, wherein the film consists of:
  I. a first layer comprising low density polyethylene and linear low density polyethylene;
  II. a second layer comprising high density polyethylene and linear low density polyethylene;
  III. a third layer comprising linear low density polyethylene and low density polyethylene;
  IV. a fourth layer comprising high density polyethylene and linear low density polyethylene; and
  V. a fifth layer comprising linear low density polyethylene and low density polyethylene.

9. The package according to claim 8, wherein the film consists of:
  I. a first layer comprising between 60 and 90% by weight low density polyethylene and between 10 and 40% by weight linear low density polyethylene;
  II. a second layer comprising between 40 and 70% by weight high density polyethylene and between 30 and 60% by weight linear low density polyethylene;
  III. a third layer comprising between 20 and 60% by weight low density polyethylene and between 40 and 80% by weight linear low density polyethylene;
  IV. a fourth layer comprising between 40 and 70% by weight high density polyethylene and between 30 and 60% by weight linear low density polyethylene; and
  V. a fifth layer comprising between 60 and 100% by weight linear low density polyethylene and between 0 and 40% by weight low density polyethylene.

10. The package according to claim 5, wherein the film consists of:
  I. a first layer comprising between 60 and 90% by weight low density polyethylene and between 10 and 40% by weight linear low density polyethylene having a layer thickness between 10 and 20 micrometers;
  II. a second layer comprising between 40 and 70% by weight high density polyethylene and between 30 and 60% by weight linear low density polyethylene having a layer thickness between 1 and 10 micrometers;
  III. a third layer comprising between 20 and 60% by weight low density polyethylene and between 40 and 80% by weight linear low density polyethylene having a layer thickness between 10 and 20 micrometers;
  IV. a fourth layer comprising between 40 and 70% by weight high density polyethylene and between 30 and 60% by weight linear low density polyethylene having a layer thickness between 1 and 10 micrometers; and
  V. a fifth layer comprising between 60 and 100% by weight linear low density polyethylene and between 0 and 40% by weight low density polyethylene having a layer thickness between 10 and 20 micrometers.

11. A 5 layer film according to claim 1, wherein the film consists of
  I. a first layer comprising between 60 and 90% by weight low density polyethylene and between 10 and 40% by weight linear low density polyethylene;
  II. a second layer comprising between 40 and 70% by weight high density polyethylene and between 30 and 60% by weight linear low density polyethylene;
  III. a third layer comprising between 20 and 60% by weight low density polyethylene and between 40 and 80% by weight linear low density polyethylene;
  IV. a fourth layer comprising between 40 and 70% by weight high density polyethylene and between 30 and 60% by weight linear low density polyethylene; and
  a fifth layer comprising between 60 and 100% by weight linear low density polyethylene and between 0 and 40% by weight low density polyethylene.

* * * * *